March 4, 1952            H. F. MATARÉ            2,588,262
MEANS FOR VARYING ELECTROMAGNETIC
WAVES IN A WAVE GUIDE
Filed April 21, 1948                                      2 SHEETS—SHEET 1
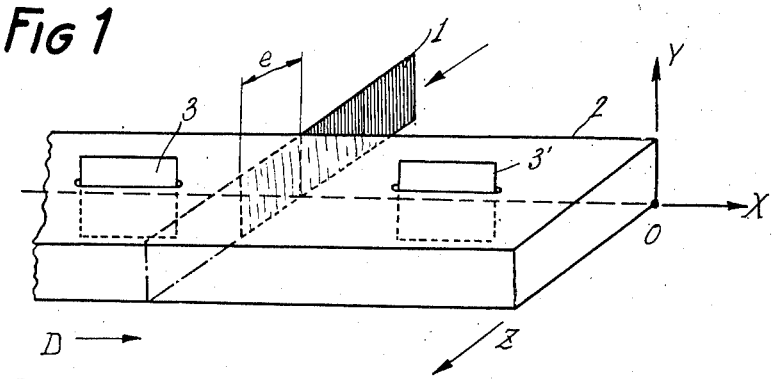
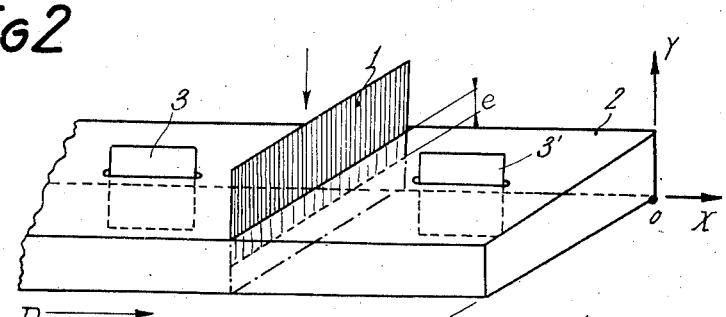
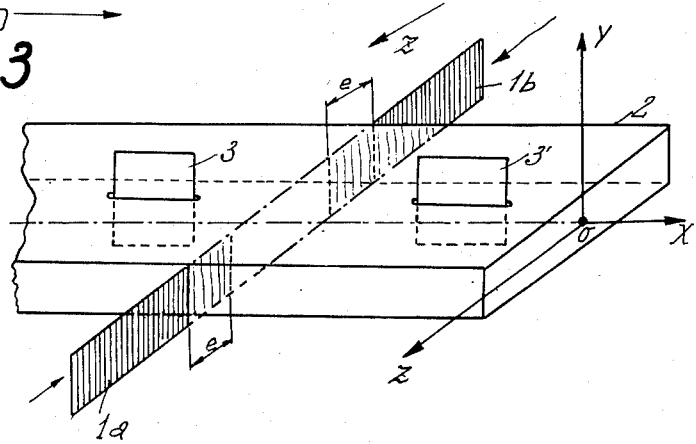
INVENTOR:
Herbert François Matare
By: John H Graham
His Agent

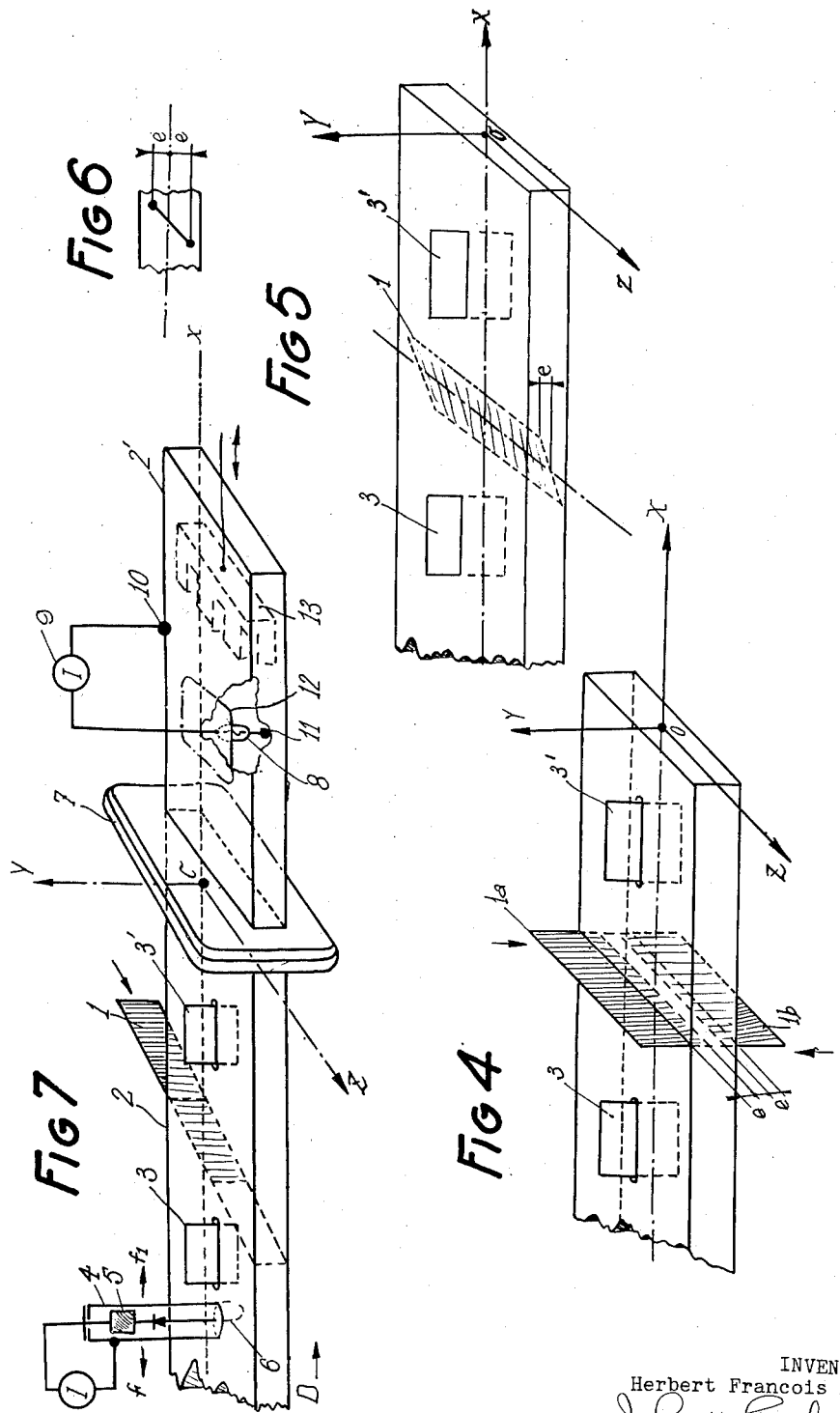

Patented Mar. 4, 1952

2,588,262

UNITED STATES PATENT OFFICE 2,588,262

MEANS FOR VARYING ELECTROMAGNETIC WAVES IN A WAVE GUIDE

Hérbert François Mataré, Vaucresson, France, assignor to Societe anonyme dite: Compagnie des Freins et Signaux Westinghouse, Paris, France Application April 21, 1948, Serial No. 22,306
In France May 22, 1947

4 Claims. (Cl. 178—44)

The present invention relates to wave guides for ultra-short electromagnetic waves and, more particularly, to means for varying and measuring the energy of such waves propagated in a wave guide.

It is known that with wave lengths of the order of several decimeters it is still possible to utilize solid conductors, subject to certain special technical considerations which will lead to the arrangement of the conductors in the form of co-axial transmission lines. Such transmission lines are capable of being utilized in combination with devices (for example, oscillatory circuits, selectors, filters etc.) which are commonly used for wavelengths greater than one meter, although again subject to certain supplementary precautions.

As wave lengths of the order of one centimeter are approached, it is necessary to replace the devices referred to by equivalent devices of the cavity resonator type. It will, however, be possible to employ, with certain reservations, the methods of determination and calculation applicable to coaxial lines in connection with these so-called ultra-short waves which represent the boundary zone between the radio-electric waves proper and the optical waves.

Still, the measuring of plane-polarized electromagnetic waves requiring hollow conductors or wave guides for their propagation presents a certain number of difficulties, the most important of them being constituted by the problem of controlling or calibrating the power or amount of energy transmitted. In fact, besides the purely mathematical aspects of the problem, it will be important to consider the shape and practical arrangement of the attenuators or power control devices to be used in connection with generators used for reference or measuring purposes; these devices, moreover, should be adapted for a range of energy covering several powers of ten of the amounts of energy to be measured.

An object of the present invention is, therefore, to provide simple and conveniently operable means for controlling the transfer of energy in a wave guide designed for ultra-short waves.

Another object of the invention is to provide, in a wave guide, means for controlling the electric waves passing through the guide and means for measuring the power of the waves thus controlled.

A further object is to provide an apparatus for accurately determining the sensitivity of a receiver or the like for ultra-high frequency waves.

According to a feature of the present invention, there is provided in a wave guide for electromagnetic waves means for controlling the flow of energy comprising one or more foils of electrically resistive material acting as reflection-free decoupling elements, said elements being disposed in the direction of propagation of the electromagnetic waves referred to, the degree of coupling between these foils and the wave guide being preferably adjustable.

According to another feature of the invention, the aforesaid foils of resistance material are combined with shutter means of a type known per se (single or double slides, rotatable dampers etc.) and are arranged ahead and back of such shutter means, respectively, by a distance dependent on the wave length.

In accordance with the present invention, the above and other objects, features and advantages are accomplished by providing, in an electric wave measuring arrangement, tubular means adapted to guide electro-magnetic waves, an adjustable planar shutter extending through the tubular guide means transversely to the direction of propagation of said waves and planar electrical resistances extending through the tubular guide means in a plane parallel to the direction of propagation of the waves and arranged at opposite sides of the shutter at such distance from the latter depending on the wave length that reflection on the shutter is avoided, the planar electrical resistances being movable in said tubular guide means for varying the coupling factor between the electrical resistances and the electro-magnetic waves. In one embodiment of the invention, the shutter is movable in a direction transversal to the length of the tubular guide means for effecting its adjustment, while in another embodiment the shutter is rotatable around an axis extending transversal to the length of the tubular guide means for effecting the shutter adjustment.

The above and other features and objects of the invention will become apparent from the following description, reference being had to the accompanying drawing in which:

Fig. 1 is a perspective view of a wave guide according to the invention provided with a single asymmetrical shutter moveable in the OZ direction;

Fig. 2 is a view similar to Fig. 1 but showing a single asymmetrical shutter moveable in the OY direction:

Fig. 3 is a view similar to Fig. 1 but showing a symmetrical shutter;

Fig. 4 is a view similar to Fig. 2 but showing a symmetrical shutter.

Fig. 5 is a view similar to Fig. 1 but featuring a rotatable damper;

Fig. 6 is a fragmentary longitudinal cross section of the wave guide shown in Fig. 5; and Fig. 7 is a perspective view of a power measuring device for electromagnetic waves according to the invention, incorporating a wave guide according to Fig. 1.

As shown in Figs. 1 through 5, the invention provides at opposite sides of a single shutter 1 (Figs. 1, 2 and 5) or a double shutter 1a, 1b (Figs. 3 and 4), which projects into the wave guide 2, a pair of resistance foils 3 and 3' oriented parallel to the direction of propagation of the electromagnetic waves, these foils acting as reflection-free decoupling means slidably arranged to extend to a greater or lesser depth into the wave guide 2.

While the resistance foils 3, 3' are arranged in the manner described, that is parallel to the axis OX and displaceable parallel to the axis OY, an asymmetric arrangement such as shown in Fig. 1 comprises a simple shutter 1 coupled inductively with the wave guide and slidable in a direction parallel to the axis OZ, the waves traveling in the guide 2 in the direction indicated by the arrow D.

As shown in Fig. 2, the shutter or control element may also be a simple shutter 1 as in the previous example but coupled capacitively with the wave guide and slidable in a direction parallel to the axis OY.

The symmetrical arrangement shown in Fig. 3 or Fig. 4 comprises a double shutter 1a, 1b displaceable symmetrically in opposite directions parallel to the axis OZ (inductive coupling) or parallel to the axis OY (capacitive coupling), respectively.

In the special arrangement illustrated in Figs. 5 and 6, the shutter is also of the simple type but is represented by a damper pivotable around an axis parallel to OZ, instead of being slidable as in Figs. 1 and 2.

In all the embodiments described above, $e$ represents the extent of the coupling of the shutter or control element with the wave guide.

The shutters are preferably made of polished brass and the resistance foils preferably consist of layers of conductor material of predetermined and calibrated resistivity per unit of surface which are supported on two dielectric plates, e. g. of plastic material such as a synthetic resin, in order to assure their rigidity. These foils are coupled non-galvanically to the wave guides.

In Fig. 7 there is shown an arrangement for measuring the power of electromagnetic waves propagated in a wave guide, wherein there is utilized one of the aforedescribed combinations of a shutter with resistance foils such as, for example, the combination shown in Fig. 1.

The wave guide 2, provided with a single or simple shutter 1 slidable in a direction parallel to OZ and having resistance foils 3 and 3' disposed at opposite sides of the shutter 1, said foils extending in a plane parallel to the plane XOY and passing through the axis OX, comprises ahead of the first resistance foil 3 a probe 4 which includes a detector 5, of the crystal rectifier type, this probe being slidable in accordance with the arrows $f$ and $f_1$ in a direction parallel to OX, and further comprises a coupling loop 6 which may be oriented in any desired manner by rotation around its vertical axis. When the plane of the loop is parallel to the axis X, the coupling is zero.

Back of the second resistance coil 3' the wave guide is connected, in conventional manner, by means of a joint 7 to a second wave guide 2' wherein there is disposed a measuring device represented, for example, by a bolometer 8 connected to an indicator 9, the two extremities 10 and 11 of the measuring circuit being grounded and a capacitive member 12 being provided for coupling to the wave guide 2'. A tuning piston 13, slidable in the direction OX, is provided as a terminating element.

The assembly illustrated in Fig. 7, having been adjusted by suitable manipulation of the shutter 1 and the resistance foils 3, and 3' and having been tuned to the desired wave length by means of the piston 13, may serve as a measuring apparatus. For this purpose the bolometer 8 is removed and replaced by a receiver or the like whose sensitivity is to be determined. Extrapolation for very small amounts of energy, not directly detectable by the bolometer, may be effected quite readily by reason of the simplicity of the law of attenuation inherent in the type of shutters described.

It will be understood that, in the measuring apparatus shown by way of example in Fig. 7, the coil and shutter combination 1, 3 and 3' may be replaced by the corresponding combination illustrated in any of the Figures 2 through 5. Also, the bolometer 8 may be replaced by some other thermal measuring device such as a thermocouple or a thermistor, for example.

In any event there will be provided a measuring system wherein, by virtue of the invention, means is provided for accurately determining the power or amount of energy transmitted or delivered to a receiver.

For a better understanding of the spirit of the invention, it will be well to recall that the action of the various component parts of the arrangements disclosed is predeterminable with the aid of simple formulae taking into account the geometrical configuration of said elements as a function of the wave length. Thus, the degree of insertion of the energy-absorbing decoupling elements or resistance foils into the wave guide will permit a coarse adjustment of the assembly, such as the selection of various ranges each representing a power of ten of the energy to be measured, while the shutter or shutters will allow for the vernier adjustment of the propagated energy. The formulae referred to are not given herein, because of their theoretical and demonstrative character, but are in every case readily deducible by persons skilled in the art of high frequency engineering on the basis of the premises set forth hereinabove.

It is to be distinctly understood that the arrangements described hereinabove and shown in the drawing are given merely by way of example, these arrangements being capable of various modifications and adaptations without exceeding the spirit and scope of the invention.

What is claimed is:

1. In an electric wave measuring arrangement, tubular means adapted to guide electric-magnetic waves, adjustable planar shutter means extending through said tubular means transversely to the direction of propagation of said waves and planar electrical resistance means extending through said tubular means in a plane parallel to the direction of propagation of said waves and arranged on both sides of said shutter means at such a distance from said shutter means that reflection on said shutter means is avoided, said planar electrical resistance means being movable in said tubular means whereby the coupling factor between said electrical resistance means and said electro-magnetic waves is varied.

2. In an electric wave measuring arrangement, the combination as defined in claim 1 wherein said planar electrical resistance means are arranged at a distance from said shutter means depending on the wave length.

3. In an electric wave measuring arrangement, the combination as defined in claim 1 wherein said shutter means are moveable in a direction transversal to the length of said tubular means.

4. In an electric wave measuring arrangement, the combination as defined in claim 1 wherein said shutter means are rotatable around an axis transversal to the length of said tubular means.

HÉRBERT FRANÇOIS MATARÉ.

REFERENCES CITED

The following references are of record in the file of this patent:

UNITED STATES PATENTS

| Number | Name | Date |
| --- | --- | --- |
| 2,197,122 | Bowen | Apr. 16, 1940 |
| 2,427,100 | Kihn | Sept. 9, 1947 |
| 2,433,368 | Johnson et al. | Dec. 30, 1947 |
| 2,479,650 | Tiley | Aug. 23, 1949 |
| 2,491,669 | Larson | Dec. 20, 1949 |
| 2,542,185 | Fox | Feb. 20, 1951 |
| 2,549,131 | Rideout | Apr. 17, 1951 |

OTHER REFERENCES

Publication (I) "Techniques and Facilities for Microwave Radar Testing," by Green et al., Bell System Tech. Journal, July 1946, pages 446, 447 and 449, vol. XXV #3. (Copy in Division 16).

Publication (II) "Radar Electronic Fundamentals," NAVSHIPS 900,016 Bureau of Ships, Navy Department, Washington, D. C., April 1944, released July 5, 1944, pages 373, 375, 376. (Copy in Division 51.)